United States Patent
Ahokas et al.

(10) Patent No.: US 6,370,953 B1
(45) Date of Patent: Apr. 16, 2002

(54) METHOD FOR BALANCING A CYLINDER, ROLL OR EQUIVALENT PART WITH A THIN MANTLE AND BALANCED CYLINDER, ROLL OR EQUIVALENT PART WITH A THIN MANTLE

(75) Inventors: Matti Ahokas, Jyskä; Auvo Saari, Jyväskylä; Eero Kalapudas, Tikkakoski; Jorma Snellman, Jyväskylä, all of (FI)

(73) Assignee: Valmet Corporation, Helsinki (FI)

( * ) Notice: Subject to any disclaimer, the term of this patent is extended or adjusted under 35 U.S.C. 154(b) by 0 days.

(21) Appl. No.: 09/402,305
(22) PCT Filed: Mar. 27, 1998
(86) PCT No.: PCT/FI98/00277
§ 371 Date: Oct. 1, 1999
§ 102(e) Date: Oct. 1, 1999
(87) PCT Pub. No.: WO98/46973
PCT Pub. Date: Oct. 22, 1998

(30) Foreign Application Priority Data
Apr. 2, 1997 (FI) .................................................. 971345

(51) Int. Cl.[7] ................................................ G01M 1/16
(52) U.S. Cl. .......................................... 73/470; 73/460
(58) Field of Search ......................... 73/460, 468, 469, 73/470

(56) References Cited

U.S. PATENT DOCUMENTS

| | | | |
|---|---|---|---|
| 4,235,124 A | 11/1980 | Banzhaf et al. | 74/573 R |
| 5,096,734 A | 3/1992 | Nikulainen et al. | 427/8 |
| 5,331,737 A | 7/1994 | Järvelä | 29/895.21 |
| 5,813,346 A * | 9/1998 | Solomon | 101/483 |

FOREIGN PATENT DOCUMENTS

| | | | |
|---|---|---|---|
| DE | 3733339 | 4/1989 | B65H/27/00 |
| DE | 4417194 | 11/1995 | G01M/1/32 |
| FI | 81660 | 5/1990 | F16F/15/32 |
| WO | 9533143 | 12/1995 | F16F/15/32 |

OTHER PUBLICATIONS

Claims 1 and 2 and Abstract of Valmet Paper Machinery Inc.'s Fl Pat. Appl. No. 893915, filed Aug. 21, 1989 (1 page).

Copy of International PCT Search Report (4 pages).

* cited by examiner

Primary Examiner—Richard A. Moller
(74) Attorney, Agent, or Firm—Steinberg & Raskin, P.C.

(57) ABSTRACT

A method and apparatus is disclosed for balancing a cylinder, roll, or equivalent part, with a thin mantle, by which deviations in the circumferential deflection line of the mantle can be compensated in order to correct for dynamic runout. Errors in the circumferential deflection line are measured and dynamic runout is determined. Locations and magnitudes of any counterweights necessary for balancing are determined based on deformations and dynamic runout arising from deviations in the deflection line of the mantle. Counterweights are fixed to the inner face of the mantle of the cylinder, roll or equivalent part at positions determined from measurements.

20 Claims, 3 Drawing Sheets

METHOD FOR BALANCING A CYLINDER, ROLL OR EQUIVALENT PART WITH A THIN MANTLE AND BALANCED CYLINDER, ROLL OR EQUIVALENT PART WITH A THIN MANTLE

SUMMARY OF THE INVENTION

The invention relates to a method for balancing a cylinder, roll or equivalent part with a thin mantle intended to be revolving. The deformations of said part while the part revolves are controlled by this method.

The invention also relates to a balanced cylinder, roll or equivalent part having a thin mantle which is intended to be revolving.

BACKGROUND OF THE INVENTION

In the state of the art, it has been observed that the round shape of a drying cylinder becomes oval when the cylinder is rotated. The effect of this deformation cannot be eliminated by means of the modes of balancing known from prior art because it causes dynamic run-out, which is due to deviations in the circumferential deflection line. By means of prior-art balancing methods it has not been possible to control the problems caused by the states of dynamic run-out because the known methods compensate for deviations in the axial deflection line. In some instances, such deviations in the circumferential deflection line cause many problems, for example, inaccuracy in doctoring, wear of a doctor blade, fluttering of a web, and an increase in the curvature of the seam of a wire. Moreover, it has been necessary to use a thicker mantle than required by other dimensioning considerations in order that the problems associated with the dynamic run-out might be solved.

The above-noted prior-art problems associated with dynamic run-out will be further aggravated in the future when the running speeds of paper machines increase.

With regard to the prior art, reference may be made to FI Patent 82856, which discloses a method for balancing a roll in which an annular rail is fixed to the inner face of the roll and a balance weight is attached to said rail. The rail is fixed to the inner part of the roll mantle only at the ends of the rail and preferably close to the longitudinal joint of the tubular roll. The final fixing of the rail takes place at the stage at which the longitudinal jointing of the tubular roll is performed. This known method rectifies an error in the axial deflection line of the roll, but it cannot rectify deviations in the circumferential deflection line occurring in a cylinder, roll, or equivalent part with a thin mantle during rotation, when the mantle changes its shape, for example, flattens. Thus, by this arrangement it is not possible to rectify the uneven mass distributions resulting, for example, from differences in the thickness of the mantle.

OBJECTS AND SUMMARY OF THE INVENTION

An object of the invention is to provide a method for balancing a cylinder, roll or equivalent part having a thin mantle, by which method the deviations in the circumferential deflection line of the mantle can be compensated for such that the states of dynamic run-out do not cause problems when a cylinder, roll, or equivalent part with a thin mantle revolves.

An object of the invention is thus to provide a method which compensates for the deviations in the circumferential deflection line, which deviations depend on differences in the thickness/mass of the mantle and thus produce deformations and unbalance when a cylinder, roll or equivalent part with a thin mantle revolves.

With a view to achieving the above objectives and those that will come out later, the method in accordance with the invention is mainly characterized in that the method comprises the following steps:

In the method, the deviations in the circumferential deflection line of a mantle of a cylinder, roll or equivalent part with a thin mantle are measured, and dynamic unbalance is determined, locations and magnitudes of counterweights necessary for balancing are determined based on the deformations and dynamic run-out arising from the deviations in the deflection line of the mantle, and the counterweights are fixed to the inner face of the mantle of the cylinder, roll, or equivalent part with a thin mantle in order to compensate for the deviations in the circumferential deflection line and, thus, to eliminate the dynamic run-out.

The cylinder, roll or equivalent part with a thin mantle in accordance with the invention is, in turn, characterized in that counterweights of magnitudes necessary for balancing are fitted to the inner face of the mantle of the cylinder, roll or equivalent part with a thin mantle, to positions determined on the basis of measurements, in order to compensate for the deviations in the circumferential deflection line of the mantle such that, when the cylinder, roll or equivalent part revolves, the circumferential deflection line is compensated for and dynamic run-out is eliminated.

In the method in accordance with the invention, the deviations in the circumferential deflection line are compensated for such that the dynamic run-out is determined first by measurement and the need for balancing is determined by calculation, and the cylinder is balanced by fitting counterweights to the inner face of the mantle, the magnitude and position of said counterweights being thus determined by calculation on the basis of unbalance measurements. The measurements may be performed by a balance machine and/or as ultrasound measurement and/or as manual measurement so as to find out the differences in the thickness/mass of the mantle causing deviations in the circumferential deflection line, which differences are compensated for by means of counterweights fitted to the inner face of the roll, which counterweights rectify the deformation of the mantle such that, when the cylinder, roll, or equivalent part having a thin mantle revolves, its shape does not change, and the rotation thus takes place in a state of balance.

In accordance with the invention, some counterweights, which are preferably longitudinal, are fitted inside a drying cylinder mainly in the middle area of the mantle in the longitudinal direction in order to cancel the deformation of the mantle. The counterweights are fitted to positions determined by calculation, and if a cylinder mantle is involved that becomes, for example, oval during rotation, the counterweights are fitted preferably on two sides of the mantle such that they are situated at both ends of the minor axis of an ellipse, that is, at the narrowing of the diameter. The counterweights may be fixed, for example, inside heating strips made of a U-channel and nowadays placed on the inner face of a cylinder, to the portions between arc hoops. When rolls are balanced in a similar way, the weights may be fixed either by means of screw couplings to the inner face of the mantle or, for example, by means of arc hoops. The counterweights may, of course, be also attached in many other ways familiar in itself to a person skilled in the art; in cylinders, however, special attention shall be paid to the fact that the mantle of the cylinder must not be damaged.

In the arrangement in accordance with the invention, advantages are achieved when the dynamic run-out decreases, in which connection, among other things, savings in costs are achieved since the thickness of the mantle can be reduced because of the decrease in unbalance. Moreover, it is possible to "save" cylinders, rolls or equivalent whose unbalance would otherwise exceed the limit of rejection. In addition, doctoring is improved because the shape remains round with the result that the blade pressure of the doctor is constant for a revolution of a cylinder, whereby the life of doctor blades also increases. Furthermore, fluttering of the web decreases and the curvature of the seam of the wire is reduced and the need for after-balancing also diminishes when rotation takes place without any unbalance. Moreover, the arrangement in accordance with the invention reduces the need for precision machining because the mass/thickness deviations and/or machining deviations of material can be compensated for by the method in accordance with the invention.

When the method in accordance with the invention is compared with prior-art methods, one essential difference is that the prior-art methods compensate for an error in the axial deflection line, whereas the method in accordance with the invention compensates for deviations in the circumferential deflection line, which deviations depend on differences in the thickness/mass of the mantle.

BRIEF DESCRIPTION OF THE DRAWINGS

In the following, the method in accordance with the invention will be described in more detail with reference to the figures in the accompanying drawing, to the details of which the invention is in no way intended to be narrowly confined.

in FIG. 1A when the cylinder is not revolving and in FIG. 1B when the cylinder is revolving.

in FIG. 2A in a situation when the cylinder is not revolving and in FIG. 2B in a situation when the cylinder is revolving.

DETAILED DESCRIPTION OF THE INVENTION

Figure 1A:
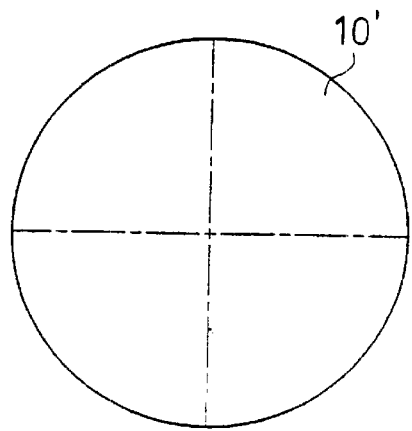
FIGS. 1A–1B show the problems encountered in connection with a prior-art cylinder, when the cylinder is not balanced.
Figure 1B:
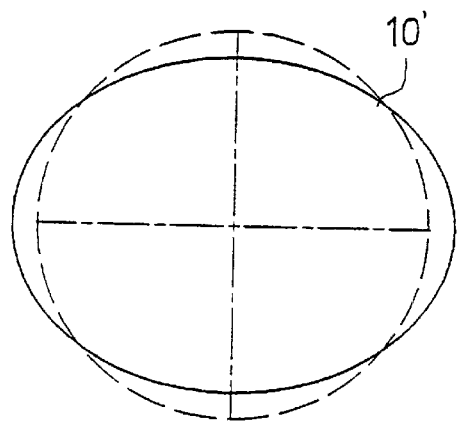

As shown in FIG. 1A, a prior-art cylinder 10', which has not been balanced, is circular in its circumferential shape in a situation when the cylinder 10' is not revolving. When the cylinder 10' is started to revolve, it flattens and becomes elliptic, as seen from FIG. 1B, with the result that unbalance arises because of dynamic run-out.

Figure 2A:
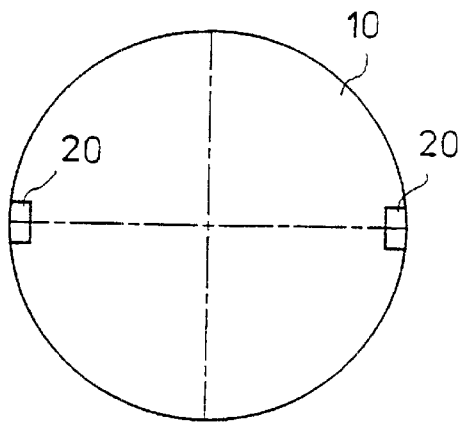
FIGS. 2A–2B schematically show a cylinder balanced in accordance with one embodiment example of the invention.
Figure 2B:
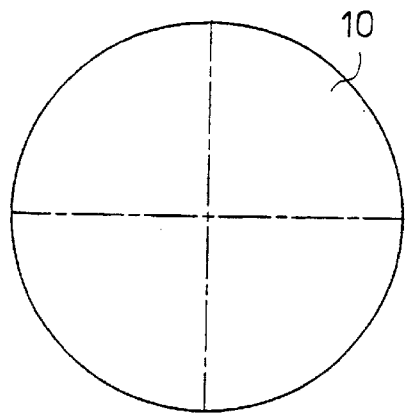

FIGS. 2A and 2B show a cylinder balanced in accordance with the invention in the above-mentioned situations, i.e. when the cylinder 10 is not revolving (FIG. 2A) and when the cylinder 10 is revolving (FIG. 2B), in which connection it is observed that there occurs no flattening during rotation. In this embodiment example of the invention, counterweights 20 are placed, as compared with FIGS. 1A–1B, at both ends of the minor axis of the ellipse of the cylinder 10.

Figure 3:
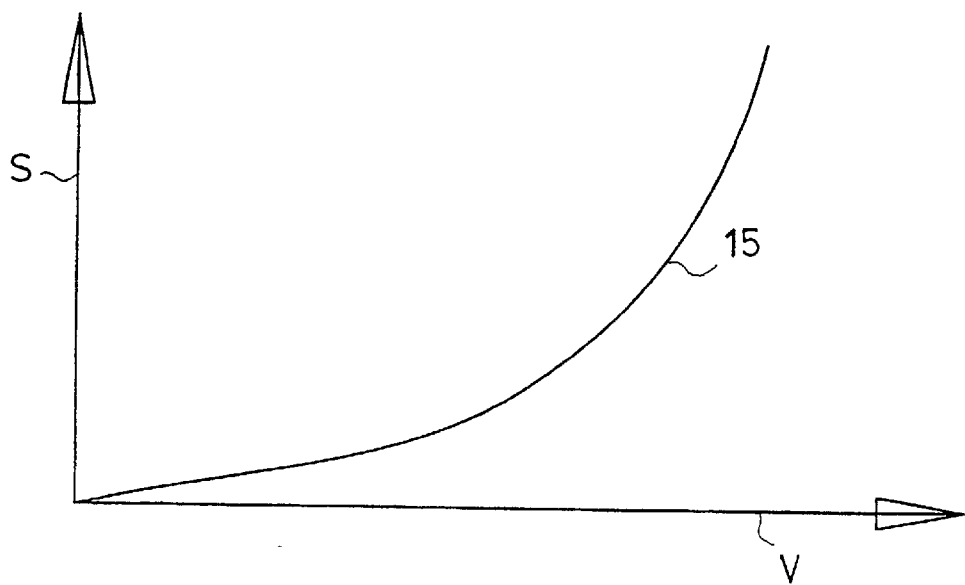
FIG. 3 schematically shows the dependence of dynamic run-out on the speed of revolution.

As seen from FIG. 3, dynamic run-out increases sharply with increasing speed of rotation, which is clear from an exponential curve 15 which shows the dynamic run-out S as a function of the speed of rotation V when a cylinder or equivalent has not been balanced and there are differences in the thickness/mass of the mantle thereof. The speed of rotation V is shown on the horizontal axis and the dynamic run-out S is shown on the vertical axis. When the part has been balanced in accordance with the invention, in the cylinder or equivalent there occurs no more any dynamic run-out S exponentially increasing as a function of the speed of rotation V.

Figures 4A, 4B:
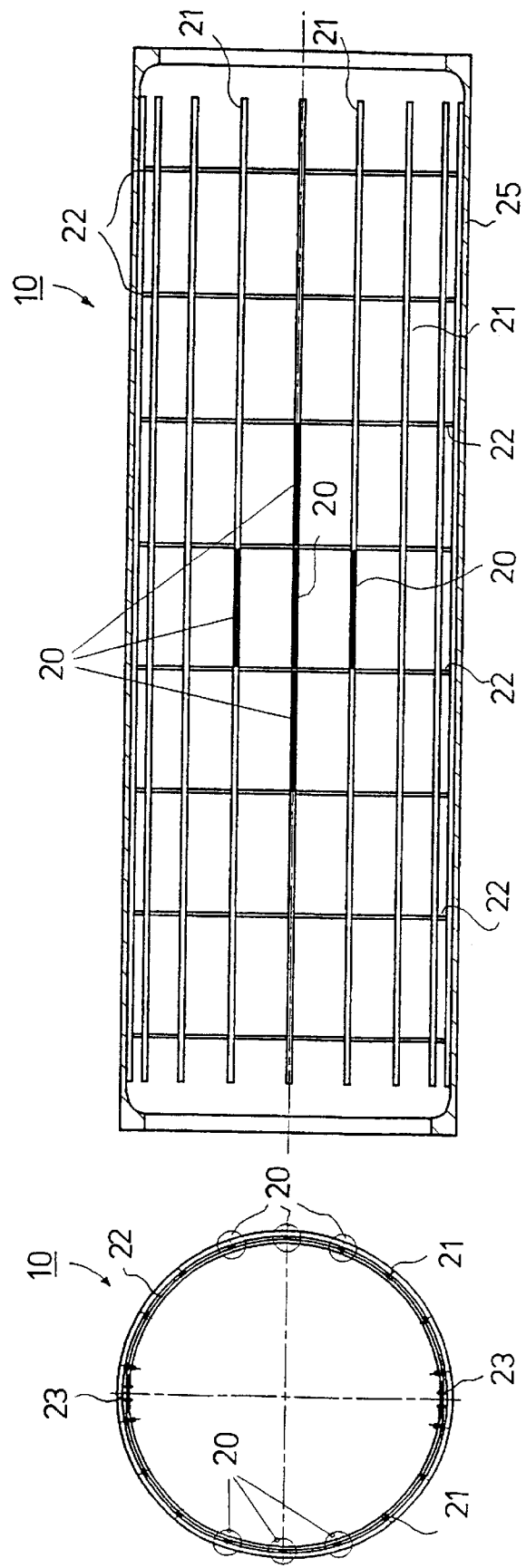
FIGS. 4A–4B schematically show one embodiment example of a cylinder balanced in accordance with the invention.

FIGS. 4A–4B schematically show one embodiment example of the cylinder 10 balanced in accordance with the invention; FIG. 4A is a schematic sectional view in the cross direction and FIG. 4B is a schematic sectional view in the longitudinal direction. To simplify the matter, for example, the end structures of the cylinder 10 have been omitted from the figures and only the mantle structure 25 of the cylinder 10 is illustrated. Longitudinal heating strips, preferably made of a U-channel, fixed to the inner face of the mantle 25 of the cylinder 10 are denoted with the reference numeral 21 and cross-direction arc hoops are denoted with the reference numeral 22. When the need for balancing in the cylinder 10 has been determined by calculation after measurements of unbalance, the locations of counterweights 20 are determined based on the measurement and calculation results, which counterweights 20 are fixed to the connection of heating strips 21, at locations where balancing is required. In the embodiment example illustrated in FIGS. 4A–4B, six counterweights 20 have been used on both sides of the cylinder 10, i.e. in total twelve counterweights 20, each of which is a longitudinal counterweight 20 and fixed in the U-channel of heating strips 21 in portions between arc hoops 22. The arc hoops 22 are fixed by means of fixing members 23 in the vertical direction at both ends of a half of the arc hoop 22. The arc hoops 22 are tightened in place by means of the fixing members 23.

Figure 5:
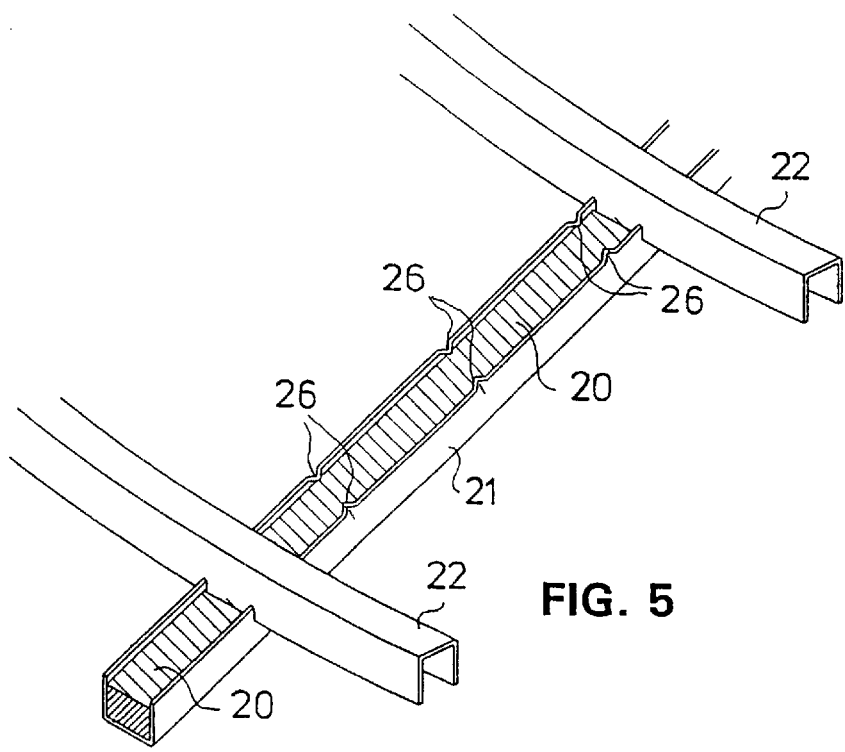
FIG. 5 schematically shows one arrangement for fixing balancing masses in accordance with the invention to the inner face of a cylinder mantle.

As a more detailed application, FIG. 5 shows fixing of a counterweight 20 in the U-channel of a heating strip 21 in a span of arc hoops 22. The heating strips 21 are made of a U-shaped channel, the counterweight 22 being placed inside the U-channel and the edge part of the U-channel being bent preferably at intervals, for example, by pressing to form fastenings 26. Of course, the counterweights 20 can also be fixed in other ways, which are in themselves obvious to a person skilled in the art and suitable depending on the application.

Above, the invention has been described only with reference to some of its preferred examples, to the details of which the invention is, however, by no means intended to be narrowly confined. Numerous variations and modifications are possible within the inventive idea defined in the following claims.

What is claimed is:

1. A method for the control of a deformation of a revolving part, the method comprises the following steps:
   measuring deviations from circularity of a circumference of a mantle (25) of a cylinder (10) wherein said mantle (25) is a thin mantle, and
   determining a dynamic run-out,
   determining a location and a magnitude of a plurality of counterweights (20) necessary for balancing said revolving part based on the deformations and dynamic run-out arising from the deviations in the deflection line of the mantle (25), and affixing the counterweights (20) to an inner face of the mantle (25) of the cylinder (10) in order to compensate for said deviations in the circumferential deflection line and, thus, to eliminate the dynamic run-out.

2. A method as claimed in claim 1, wherein in the method, measurement of deformations arising from deviations in the circumferential deflection line of the mantle (25) is performed by a balance machine and/or as ultrasound measurement and/or as manual measurement in order to determine the thickness/mass difference in the mantle (25) causing deformations.

3. A method as claimed in claim 1, wherein, in the method, the locations and magnitudes of the counterweights (20) are determined by calculation based on the measurement results.

4. A method as claimed in claim 1, wherein the method uses longitudinal counterweights (20) placed in a middle area in the longitudinal direction of the mantle (25).

5. A method as claimed in claim 1, wherein in the method, the counterweights (20) are fixed inside a U-channel of heating strips (21) of the cylinder (10), and that an edge part of the U-channel is bent so as to form fastenings (26) spaced from one another in order to fix the counterweights (20) in place.

6. A balanced cylinder having a thin mantle wherein said cylinder is structured and arranged to be revolved, comprising,
counterweights (20) of magnitudes necessary for balancing fitted to an inner surface of the mantle (25) of the cylinder (10), said counterweights being fitted to positions determined on the basis of measurements, in order to compensate for deviations in a circumferential deflection line of the mantle (25) such that, when the cylinder (10) revolves, the circumferential deflection line is compensated for and a dynamic run-out of said cylinder is eliminated.

7. A cylinder, roll or equivalent part with a thin mantle as claimed in claim 6, wherein the counterweights (20) are fitted to positions which are determined by measurements and by calculation and in which differences in the thickness/mass of the mantle (25) cause deviations in the circumferential deflection line.

8. A cylinder, roll or equivalent part with a thin mantle as claimed in claim 6 in that the counterweights (20) are placed in a middle area of the mantle (25).

9. A cylinder, roll or equivalent part with a thin mantle as claimed in claim 6, wherein the counterweights (20) are longitudinal and that the counterweights (20) are placed in a longitudinal direction of the mantle (25).

10. A cylinder, roll or equivalent part with a thin mantle as claimed in claim 6, wherein the counterweights (20) are fixed inside the U-channel of heating strips (21) situated on the inner face of the mantle (25) of the cylinder (10), and that the edge part of the U-channel is bent to form fastenings (26) spaced from one another.

11. A method for controlling a deformation of a revolving cylinder having a thin mantle comprising the steps of:
revolving said cylinder;
measuring a deviation in a circumferential deflection line of said mantle;
determining based upon said deviation in said circumferential deflection line a proper location on an inner face of said mantle for securing at least one counterweight to balance said revolving cylinder;
determine based upon said deviation in said circumferential deflection line a proper magnitude for said at least one counterweight to balance said revolving cylinder; and
securing said at least one counterweight having said proper magnitude to said proper location on said inner face of said mantle to thereby balance said revolving cylinder.

12. A method for controlling the deformation of a revolving cylinder according to claim 11, wherein said measuring of said deviation in a circumferential deflection line of said mantle having an inner face is performed by one of a balance machine, balance machine and manual measurement, to thereby determine thickness/mass differences in said mantle causing deformations.

13. A method for controlling the deformation of a revolving cylinder according to claim 11, wherein said proper location on said inner face and said proper magnitude are determined from said measuring of said deviation in a circumferential deflection line of said mantle having an inner face.

14. A method for controlling the deformation of a revolving cylinder according to claim 11, wherein said at least one counterweight comprises a longitudinal counterweight secured in a location along a longitudinal direction of said mantle.

15. A method for controlling the deformation of a revolving cylinder according to claim 11, wherein said cylinder comprises a plurality of heating strips having a U-shaped channel, said U-shaped channel having fastening means for securing said at least one counterweight.

16. A revolving cylinder comprising:
a body having a thin mantle, said thin mantle having an inner surface;
at least one counterweight secured to a proper location on said inner surface for balancing said cylinder, said proper location determined by a measurement of a deviation in a circumferential deflection line in said mantle;
said counterweight having a proper magnitude for balancing said revolving cylinder based upon said measurement of said deviation in said circumferential deflection line of said mantle.

17. A revolving cylinder according to claim 16, wherein said proper location on said inner surface for balancing said cylinder is determined by a measurement and a calculation to determine differences in a thickness/mass of the mantle which cause said deviation in said circumferential deflection line of said mantle.

18. A revolving cylinder according to claim 16, wherein said at least one counterweight is positioned at a middle area of said mantle.

19. A revolving cylinder according to claim 16, wherein said at least one counterweight is positioned along a longitudinal direction of said mantle.

20. A revolving cylinder according to claim 16, further comprising at least one heating strip secured to said inner face of said mantle, said at least one heating strip having a U-shaped channel adapted for securing said at least one counterweight.

* * * * *